United States Patent
Chabak

(10) Patent No.: US 8,167,122 B2
(45) Date of Patent: May 1, 2012

(54) APPARATUS AND CARTRIDGE FOR STORAGE OF COMPRESSED HYDROGEN GAS

(75) Inventor: Alexander Chabak, Moscow (RU)

(73) Assignees: C. En. Limited, Tortola (VG); Moshe Stern, Herzlia (IL)

( * ) Notice: Subject to any disclaimer, the term of this patent is extended or adjusted under 35 U.S.C. 154(b) by 740 days.

(21) Appl. No.: 12/161,792

(22) PCT Filed: Jun. 7, 2007

(86) PCT No.: PCT/IL2007/000694
§ 371 (c)(1),
(2), (4) Date: Jul. 22, 2008

(87) PCT Pub. No.: WO2007/144868
PCT Pub. Date: Dec. 21, 2007

(65) Prior Publication Data
US 2010/0219086 A1    Sep. 2, 2010

Related U.S. Application Data

(60) Provisional application No. 60/812,604, filed on Jun. 12, 2006.

(51) Int. Cl.
*F17C 1/00* (2006.01)
(52) U.S. Cl. .............. 206/0.6; 96/108; 220/560.07
(58) Field of Classification Search .............. 206/0.6, 206/0.7; 219/428, 385; 96/108; 423/447.1; 257/794; 252/188.25; 141/2; 220/560.07, 220/560.04
See application file for complete search history.

(56) References Cited

U.S. PATENT DOCUMENTS

| | | | |
|---|---|---|---|
| 4,211,537 A * | 7/1980 | Teitel | ................ 48/191 |
| 4,302,217 A | 11/1981 | Teitel | |
| 4,328,768 A | 5/1982 | Tracy et al. | |
| 4,981,625 A | 1/1991 | Rhim et al. | |
| 5,260,002 A | 11/1993 | Wang | |
| 5,376,347 A | 12/1994 | Ipponmatsu et al. | |
| 6,224,794 B1 | 5/2001 | Amsden et al. | |
| 6,890,592 B2 | 5/2005 | Seehafer et al. | |

(Continued)

FOREIGN PATENT DOCUMENTS

RU    2 283 454 C1    9/2006

(Continued)

OTHER PUBLICATIONS

Rapp, D. B. et al., "Photo-induced hydrogen outgassing of glass," J. Non-Cryst. Solids, vol. 349, 2004, pp. 254-259.

(Continued)

*Primary Examiner* — Jacob K Ackun
(74) *Attorney, Agent, or Firm* — Houston Eliseeva LLP

(57) ABSTRACT

An apparatus for storage of compressed hydrogen gas is provided. The apparatus includes a sealed housing having an outlet pipe coupled to the housing and equipped with a controllable discharge valve. The sealed housing defines a chamber that includes a cartridge comprising an assembly of at least two different types of micro-containers configured for accumulating and storing said compressed hydrogen gas. The apparatus also includes a hydrogen liberating tool configured for controllable liberating the hydrogen gas from the cartridge into a volume of the chamber that is not occupied by the cartridge. The apparatus is controlled by a control system operatively coupled to the controllable discharge valve and the hydrogen liberating tool, and configured for controlling operation thereof.

12 Claims, 6 Drawing Sheets

U.S. PATENT DOCUMENTS

| | | | |
|---|---|---|---|
| 6,998,074 B1 | 2/2006 | Radulescu | |
| 7,279,222 B2 * | 10/2007 | Hearley et al. | 428/403 |
| 2006/0026900 A1 | 2/2006 | Jang | |
| 2006/0060820 A1 * | 3/2006 | Schumacher et al. | 252/188.25 |
| 2006/0163752 A1 * | 7/2006 | Wang et al. | 257/794 |
| 2008/0237067 A1 * | 10/2008 | Salyer | 206/7 |
| 2009/0120811 A1 * | 5/2009 | Zhevago et al. | 206/6 |

FOREIGN PATENT DOCUMENTS

| | | |
|---|---|---|
| WO | 2005/028945 A2 | 3/2005 |
| WO | 2006/046248 A1 | 5/2006 |

OTHER PUBLICATIONS

Ryazantsev, E. P. et al., "Hydrogen production, storage, and use at nuclear power plants," Atomic Energy, vol. 101, No. 6, Dec. 1, 2006, pp. 876-881.

Zhevago, N. K. et al., "Hydrogen storage in capillary arrays," Energy Conversion and Management, vol. 48, No. 5, Mar. 23, 2007, pp. 1554-1559.

International Search Report and Written Opinion, mailed Nov. 19, 2007, from International Application No. PCT/IL2007/000694, filed Jun. 7, 2007.

* cited by examiner

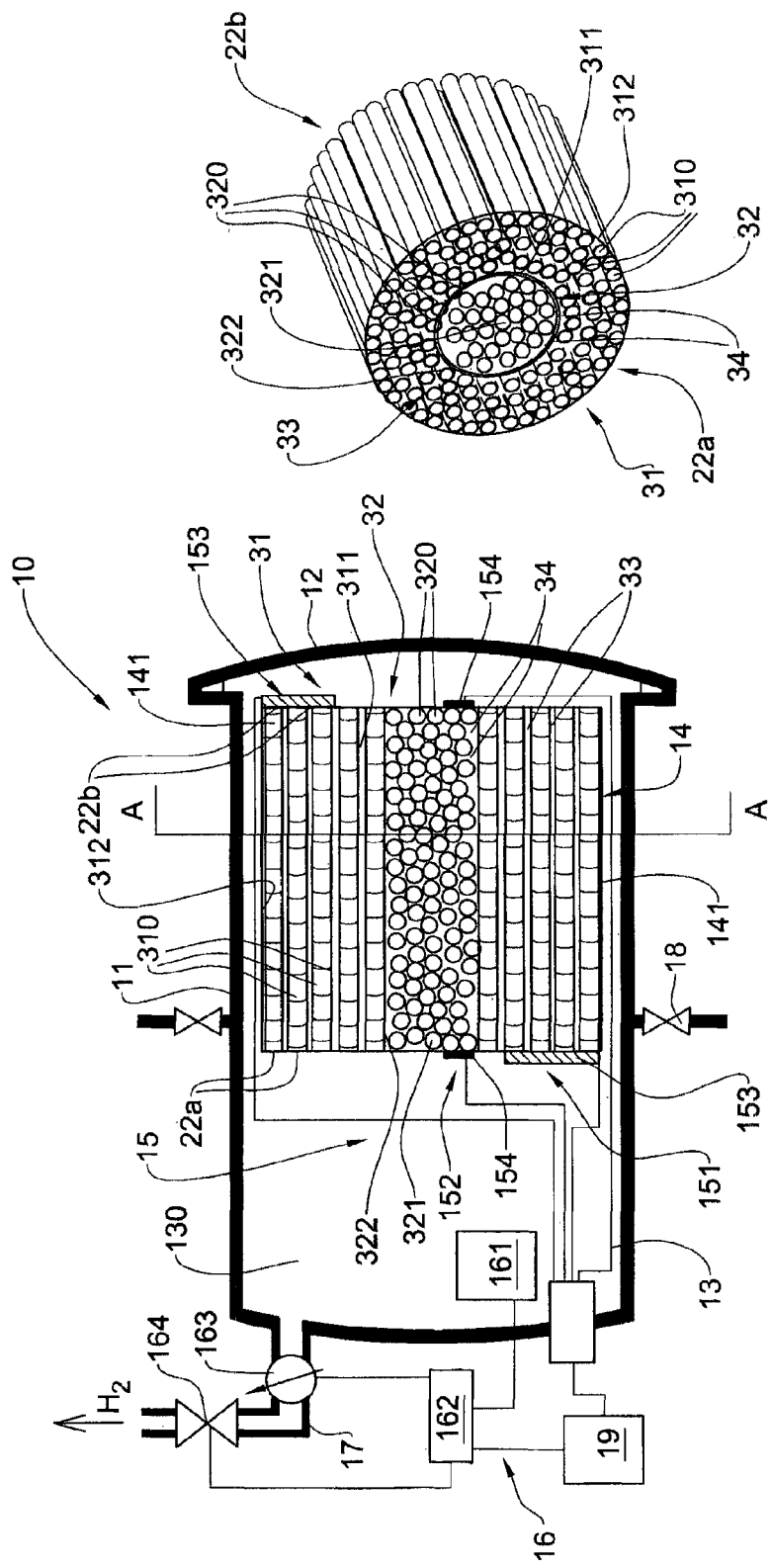

APPARATUS AND CARTRIDGE FOR STORAGE OF COMPRESSED HYDROGEN GAS

FIELD OF THE INVENTION

The present invention relates generally to fuel storage, and in particular, to accumulation and storage of hydrogen gas.

BACKGROUND OF THE INVENTION

It is well-known that hydrogen is a very high energy density element and clean-burning fuel. The energy density of hydrogen, which is around 120 MJ/kg, is more than double that of most conventional fuels, e.g., natural gas: 43 MJ/kg and gasoline 44.4 MJ/kg. Hydrogen can be combined with oxygen through combustion, or through fuel cell mediated oxidation/reduction reactions, to produce heat, or electrical power. The primary product of this reaction is water, which is non-polluting and can be recycled to regenerate hydrogen and oxygen.

Currently, hydrogen energetics is the focus of interest in nuclear industry, motor transport, auto industry, chemical industry, aerospace industry, portable power sources industry (cellular phones, computers, home appliances), etc. In particular, the transport sector is a consumer of about half of the world's crude oil production. Moreover, in large metropolitan agglomerations worldwide, road traffic represents one of the most important and fastest growing emission sources for both pollutants and noise. Hydrogen as a new vehicle fuel provides the opportunity for both, the reduction or avoidance of polluting emissions and the drastic reduction of the noise level produced. Already hydrogen operated internal combustion engines have a low noise potential and significantly reduced pollutant levels. Therefore, the transport sector of the economy is intensively adopting the use of hydrogen fuel. This can help solve environmental problems, especially in large megapolises and industrial regions.

One of the problems of hydrogen energetics is safe storage and delivery of hydrogen fuel to a combustion cell. Most generally, there are three basic hydrogen storage techniques. Hydrogen can be stored as a cryogenic liquid, as a compressed gas in a large vessel, or bound chemically in a compound such as a metal Hydride.

The infrastructural requirements for liquid hydrogen storage are high due to the very low cryogenic temperatures of −253° C. (20 K). Thus, liquid storage systems, transfer pipes and refueling couplings require significant thermal insulation in order to maintain the liquid state and avoid or retard premature rapid evaporation of liquid hydrogen.

Compressed hydrogen storage is the most common method for hydrogen storage. Typically the pressure levels are in the order of 20 MPa-70 MPa. Today's storage vessels usually are manufactured in fiber composite materials design in order to reduce structural weight. An internal shell is made of stainless steel or aluminum and is wrapped with glass and/or carbon fibers. The tank designs are also known which are made completely from plastic materials. Nevertheless, most compressed gaseous storage tanks are relatively large and heavy. Moreover, existing accumulation techniques with compressed gaseous hydrogen in tanks provide a relatively low hydrogen weight content (the ratio of the weight of hydrogen in accumulator to the weight of accumulator), i.e., less than 10 weight %, and there are certain restrictions for further growth of this parameter along with low explosion protection.

The storage of gaseous hydrogen in metal hydrides makes use of depositing hydrogen in metal alloys. The hydrogen accumulation and storage techniques are relatively explosion-proof, because hydrogen features no excess pressure. Disadvantages of metal hydride storage are that depending on the type of metal alloy, more or less elevated temperatures are needed to set hydrogen free again, and the low mass related storage density. Usually, the weight content of hydrogen is less than 4.5%.

Conceptually, also storage in other materials can be achieved by physical sorption. For example, storage of hydrogen in carbon nano-fibers is known. However, due to the weaker bonding of hydrogen in these solids the storage temperatures have to be lower than those for storage as metal hydrides.

It is known that hydrogen can be safely stored in micro-containers, such as hollow glass micro-spheres. The amount of hydrogen in each individual microsphere is very small, preventing the possibility of explosions by improper handling or during accidents.

If heated, the microsphere permeability to hydrogen will increase. Hydrogen can diffuse into the hollow cores of the micro-spheres through the thin glass walls at practical rates at temperatures between 100° C. and 400° C. This provides the ability to fill the micro-spheres with gas by placing the micro-spheres in high-temperature and high pressure environments. Once cooled, the micro-spheres lock the hydrogen inside since the diffusion rate is drastically lower at room temperature. A subsequent increase in temperature will increase the diffusion rate. Thus, the hydrogen trapped in the micro-spheres can be released by subsequently increasing the temperature.

For example, U.S. Pat. No. 4,328,768 describes a fuel storage and delivery system wherein hollow micro-spheres filled with hydrogen gas are stored in a fuel storage chamber at pressures of 400 atm. From the fuel storage chamber the micro-spheres are directed through a heated delivery chamber wherein hydrogen gas is freed by diffusion and delivered to an engine, after which the substantially emptied micro-spheres are delivered to a second storage chamber. The substantially emptied micro-spheres are removed by mechanical means, such as a pump, to a storage chamber from which they can be removed for refilling.

SUMMARY OF THE INVENTION

Despite known techniques in the area of accumulation and storage of hydrogen in micro-containers, there is still a need in the art for further improvement in order to provide a safe hydrogen storage at higher pressure, higher weight content of hydrogen, lower losses of hydrogen on storage as well as sufficient hydrogen load and release rates in operation, which will result in increased safety and cost-saving. Moreover, it would be advantageous to have a novel apparatus for storage of compressed hydrogen gas in which the rate of liberation of hydrogen gas can be controllably varied.

According to one general aspect, the present invention partially eliminates disadvantages of the prior art techniques and provides a novel apparatus for storage of compressed hydrogen gas. Specifically, the apparatus comprises a sealed housing having an outlet pipe coupled to the housing and equipped with a controllable discharge valve. The sealed housing defines a chamber that includes a cartridge. According to the present invention, the cartridge includes an assembly of at least two different types of micro-containers configured for accumulating and storing the compressed hydrogen gas. The apparatus also comprises a hydrogen liberating tool configured for controllable liberation (release) of the hydrogen gas from the cartridge into a volume of the chamber that is not occupied by the cartridge. Preferably, the apparatus also comprises a control system operatively coupled to the controllable discharge valve and the hydrogen liberating tool, and configured for controlling operation thereof. The housing can include a detachable cover adapted to open and seal the housing.

According to the invention, the pressure of the hydrogen stored within the micro-containers can be greater than 1000 atm. In turn, the pressure of the hydrogen accumulated within the volume of the chamber that is not occupied by the cartridge can be greater than 1 atm, e.g., in the range of 1 atm to 15 atm.

According to an embodiment of the invention, the control system includes a pressure sensor configured for producing a pressure sensor signal representative of the hydrogen gas pressure in the chamber. Moreover, the control system includes a flow meter configured for producing a gas flow sensor signal representative of the flow of the hydrogen gas pressure in the outlet pipe. The control system also includes a controller operatively coupled to the pressure sensor and the flow meter. Accordingly, the control system is responsive to the pressure sensor signal and the gas flow sensor signal. Thus, the controller is capable of generating control signals for controlling the operation of the hydrogen liberating tool and the discharge valve.

The apparatus can further include at least one safety valve that can be automatically open when pressure in the chamber reaches a dangerous level.

According to an embodiment of the invention, the cartridge includes a case and an assembly structure of two different types of hollow micro-containers located in the case. Thickness of the case wall can be at least 10 times greater than the thickness of the micro-container walls. According to this embodiment, the micro-containers are selected from at least one hollow partially permeable to hydrogen micro-cylinder having sealed ends, and a plurality of partially permeable to hydrogen hollow micro-spheres.

Specifically, the assembly of micro-containers includes a first portion having tubular shape, and a second portion having cylindrical shape and located within the lumen of the first portion. According to one embodiment of the invention, the first portion includes a plurality of micro-cylinders closely packed and arranged axially within the first portion. According to another embodiment of the invention, the first portion includes one or more hollow micro-cylinders being coiled round the second portion.

According to an embodiment of the invention, the second portion includes a plurality of the micro-spheres closely packed and filling the cylindrical volume of the second portion.

According to a further embodiment of the invention, the cartridge includes a plurality of interface gas collectors, each collector associated with a part of the total number of the micro-containers.

The hollow micro-cylinders can be made of material having relatively small hydrogen permeability at the temperatures below 20° C.-30° C. and more than 10 times higher permeability at the temperatures above 70° C.-90° C. A ratio of the tensile strength to the density of the material of the hollow micro-cylinders can be greater than 1000 MPa·cm$^3$/g. The material of the hollow micro-cylinder is selected from different polymer and composite materials, e.g, KEVLAR™, TWARON™, TERLON™, ARMOS™, TECHNORA™, etc. The external diameter of the micro-cylinders can, for example, be in the range of 50 micrometer to 5000 micrometers. A ratio of the wall thickness to the external diameter of the micro-cylinders can be in the range of 0.01 to 0.2. The external diameter of the micro-cylinders can be reduced from an inner surface of the first portion of the assembly structure towards an outer surface of the first portion. The wall thickness of the micro-cylinders can be increased from an inner surface of the first portion of the assembly structure towards an outer surface of the first portion.

In turn, the micro-spheres can be made of material having relatively small hydrogen permeability at the temperatures below 50° C.-70° C. and more than 10 times higher permeability at the temperatures above 200° C.-250° C. A ratio of the tensile strength to the density of the material of the micro-spheres is greater than 1000 MPa·cm$^3$/g. The material of the micro-spheres can be selected from MgAlSi glasses (e.g., S-2 Glass™, R glass available from Saint-Gobain Vetrotex Textiles, T Glass available from Nitto Boseki Co., Ltd. (Nittobo)), fused quartz, etc. The external diameter of the micro-spheres can, for example, be in the range of 50 micrometer to 5000 micrometers. A ratio of the wall thickness to the external diameter of the micro-spheres can be in the range of 0.01 to 0.2. The external diameter of the micro-spheres can be reduced from a center of the second portion towards edges of the second portion. The wall thickness of the micro-spheres can be increased from a center of the second portion towards edges of the second portion. The wall thickness of the micro-spheres is increased from a center of the second portion towards edges of the second portion.

According to an embodiment of the invention, an outer surface of the micro-cylinders and micro-spheres is at least partially coated with an electrically conductive hydrogen absorbing layer. The hydrogen absorbing layer is made of a metal selected from at least one of palladium, nickel, lanthanum-nickel alloys.

According to a further embodiment of the invention, at least a part of the micro-containers are bound together by an electrically conductive adhesive material.

According to an embodiment of the invention, the hydrogen liberating tool includes one or more electrically heating elements associated with the cartridge, and a controllable power source coupled to the control system and configured for controllable powering the electrically heating element, whereby to controllably vary a temperature of the micro-containers.

For example, the hydrogen liberating tool can include at least two heating elements associated with the two different types of micro-containers, respectively; and a controllable power source coupled to the control system and configured for controllable powering said at least two heating elements, whereby to controllably vary a temperature of the micro-containers. Specifically, the hydrogen liberating tool can includes a first heating element having a first pair of electrodes coupled to the electrically conductive hydrogen absorbing layer of the micro-spheres across said first portion of said cartridge; a second heating element having a second pair of electrodes coupled to said electrically conductive hydrogen absorbing layer of the micro-cylinders across said second portion of said cartridge; and a controllable power source coupled to the control system and configured for controllable powering the first and second heating elements, whereby to controllably vary a temperature of the micro-spheres and micro-cylinders.

According to another example, the hydrogen liberating tool can includes a first heating element having a first pair of electrodes coupled to the electrically conductive adhesive material across the first portion of said cartridge; a second heating element having a second pair of electrodes coupled to the electrically conductive adhesive material across the second portion of said cartridge; and a controllable power source coupled to the control system and configured for controllable powering the first and second heating elements, whereby to controllably vary a temperature of the micro-containers.

According to another embodiment of the invention, ends of the micro-cylinders at least proximate to said hydrogen liberating tool are covered with caps made of hydrogen diffuser material that features photo-enhanced hydrogen diffusion. The hydrogen liberating tool includes a controllable radiation source operating in a predetermined radiation frequency range. The controllable radiation source is coupled to the control system adapted to control the operation of the radiation source, thereby providing photo-enhanced diffusion of hydrogen through the hydrogen diffuser material when it is illuminated by the controllable radiation source. For example, the control of the operation of the radiation source can be carried out by varying the intensity of the applied radiation. Alternatively, the control of the operation of the radiation source can be carried out by turning the source on and off with a predetermined periodicity.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, preferred embodiments will now be described, by way of non-limiting examples only, with reference to the accompanying drawings, in which:

FIG. 2 is a schematic longitudinal cross-sectional view of the apparatus of FIG. 1 including a hydrogen storage cartridge and a hydrogen liberating tool, according to one embodiment of the present invention;

FIG. 3 is a schematic perspective view with a top cross-sectional cut of the cartridge of FIG. 2 taken along the line A-A therein;

DETAILED DESCRIPTION OF SPECIFIC EMBODIMENTS

Figure 1:
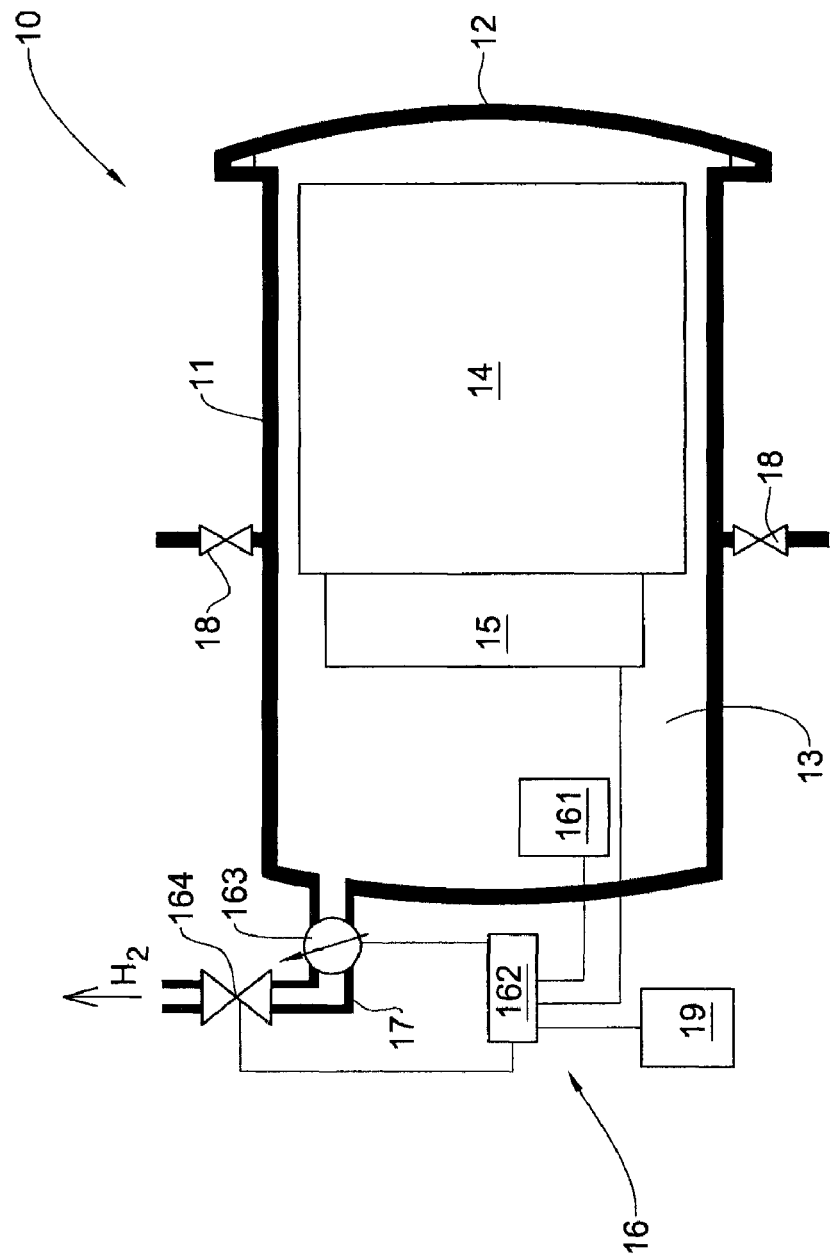
FIG. 1 is a schematic cross-sectional view of an apparatus for storage of hydrogen gas is illustrated.

The principles and operation of an apparatus for storage hydrogen gas according to the present invention may be better understood with reference to the drawings and the accompanying description. It should be understood that these drawings are given for illustrative purposes only and are not meant to be limiting. It should be noted that the figures illustrating various examples of the apparatus of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. The same reference numerals and alphabetic characters will be utilized for identifying those components which are common in the hydrogen storage apparatus and its components shown in the drawings throughout the present description of the invention.

Referring to FIG. 1, a schematic cross-sectional view of an apparatus 10 for storage of hydrogen gas is illustrated, according to one embodiment of the present invention. The hydrogen storage apparatus 10 comprises a housing 11 having a detachable cover 12 adapted to open and seal the housing 11. The sealed housing 11 defines a chamber 13 that includes a cartridge (module) 14 mounted in the chamber 13 with the help of fasteners (not shown). The cartridge 14 includes an assembly of at least two different types of micro-containers (not shown in FIG. 1) which are configured for accumulating and storing compressed hydrogen gas.

According to the present invention, the micro-containers of one type differ from the micro-containers of another type in the rate of hydrogen release from these micro-containers. The different hydrogen release rates can be achieved by variation of at least one of the following features: structure of the cartridge 14, configuration of the micro-containers in the cartridge 14, shape of micro-containers, and material from which these micro-containers are made. Various types of organization of micro-containers in the cartridge 14 will be described hereinbelow.

The cartridge 14 can be inserted into the chamber 13 and removed therefrom through an opening (not shown) that is sealed by the detachable cover 12. The apparatus 10 further includes at least one hydrogen liberating tool associated with the cartridge 14 and diagrammatically represented in FIG. 1 by a box 15. The apparatus 10 also includes a control system 16 operatively coupled to the hydrogen liberating tool 15 and configured, inter alia, for controlling operation of the hydrogen liberating tool 15. The control system 16 and the hydrogen liberating tool 15 are powered by a controllable electric power source 19 arranged outside of the housing 11 and coupled to the control system 16 and the hydrogen liberating tool 15.

The hydrogen liberating tool 15 is configured for controllable liberation (release) of hydrogen gas from the cartridge 14 in which the hydrogen is stored at very high pressures into a volume of the chamber 13 that is not occupied by the cartridge 14 and in which the hydrogen is stored at a moderate pressure. For example, the pressure of the hydrogen stored within the micro-containers of the cartridge 14 can be higher than 1000 atm (e.g., in the range of 1000 atm-3000 atm), whereas the pressure of the hydrogen within the unoccupied volume of the chamber 13 can be higher than 1 atm (e.g., in the range of 1 atm-15 atm).

For measuring pressure of the hydrogen within the unoccupied volume of the chamber 13 the control system 16 includes a pressure sensor which is diagrammatically represented in FIG. 1 by a box 161 that is operable for producing a gas pressure sensor signal. The pressure sensor 161 is coupled to a controller 162 of the control system 16 which is, inter alia, responsive to the gas pressure sensor signal and capable of generating a control signal to the hydrogen liberating tool 15 for controllable liberation of the compressed hydrogen gas from the cartridge 14.

Shape of the housing 11 can, for example, be tubular. However, it should be understood that generally, any desired shape of the housing 11 can be used. The housing 11 can be constructed of a suitable metal, plastic or composite material with thickness of the walls appropriate to withstand the strain on the walls caused by the gas pressure inside the housing 11.

The apparatus 10 also includes an outlet pipe 17 coupled to the housing 11. The control system 16 also includes a flow meter 163 and a discharge valve 164 arranged in the outlet pipe 17 and coupled to the controller 162 for controllable discharge of the gaseous hydrogen from the chamber 13. In operation, the flow of the hydrogen gas within the outlet pipe 17 is measured by the flow meter 163 that is operable for producing a gas flow sensor signal. The flow meter 163 is coupled to the controller 162 which is, inter alia, responsive to the gas flow sensor signal and capable of generating a valve control signal for controlling the operation of the discharge valve 164. The hydrogen discharged thereby can be used as a fuel or as a raw material in reactions desired by a user. The apparatus 10 can also include one or several safety valves 18 that can automatically open when pressure in the chamber 13 reaches a dangerous level.

According to the invention, such features as structure of the cartridge 14, configuration of the micro-containers in the cartridge 14, shape of micro-containers and material from which these micro-containers are made can be different.

Referring to FIG. 2, a schematic longitudinal cross-sectional view of the apparatus of FIG. 1 in which the cartridge 14 for hydrogen storage and the hydrogen liberating tool 15 are illustrated according to one embodiment of the present invention.

According to this embodiment, the cartridge 14 includes a case 141 and an assembly structure of two different types of micro-containers located in the case 141.

FIG. 3 shows a schematic perspective view with a top cross-sectional cut of the cartridge of FIG. 2 taken along the line A-A therein. It should be noted that for simplicity purposes the case 141 is not shown in FIG. 3. It should be also noted that FIGS. 2 and 3 as well as further figures (illustrating other examples of the structure of the hydrogen storage cartridge 14) are not to scale, and are not in proportion, for purposes of clarity.

As can be understood from FIGS. 2 and 3, the assembly structure of the micro-containers includes a first portion 31 having tubular shape, and a second portion 32 having cylindrical shape and located within the lumen of the first portion 31.

The first portion 31 includes a plurality of closely packed hollow micro-cylinders (microtubes) 310 arranged axially within the first portion 31. Ends 22a and 22b of the micro-cylinders 310 are sealed, e.g., capped on the ends by semi-spheres having comparable wall thickness. The hollow micro-cylinders 310 themselves or at least one of the sealed ends 22a and 22b are made of a material that is at least partially permeable to hydrogen, to allow hydrogen molecules to diffuse therethrough. In turn, the second portion 32 includes a plurality of closely packed partially permeable to hydrogen hollow micro-spheres 320 filling the cylindrical volume of the second portion 32.

Generally, the hollow micro-cylinders 310 can have any desired length. In turn, the external diameter d of the micro-containers (micro-cylinders 310 and micro-spheres 320) can be in the range of about 50 micrometers to 5 millimeters. Magnitudes of wall thickness h of the micro-cylinders 310 and the micro-spheres 320 are defined by the value of the ratio h/d, that can be obtained from the equation $h/d = p/(2\sigma)$, where p is the pressure of the hydrogen stored in the micro-cylinders 310 and the micro-spheres 320 and $\sigma$ is the tensile strength of the micro-container material. Preferably, the ratio of the wall thickness to the external diameter is in the range of 0.01 to 0.2, depending on p and $\sigma$.

It should be noted that the external diameter d and wall thickness h of the micro-cylinders located in the inner layers (i.e., in the bulk) of the first portion and the peripheral micro-cylinders can be either the same or different. Likewise, all the micro-spheres 320 can have either about the same dimension or various dimensions.

Preferably, although not shown in FIG. 2, the external diameter of the micro-cylinders 310 is reduced from an inner surface 311 of the first portion 31 towards an outer surface 312 of the first portion 31. Likewise, a diameter of the various-sized micro-spheres can be reduced (not shown) from center 321 of the second portion 32 towards edges 322 of the second portion 32. It should be understood that by placing the micro-cylinders and micro-spheres with larger diameter in the bulk and with smaller diameter towards the edges, a hydrogen accumulation and storage structure is created in which the wall tensions decreases towards the circumference due to lower diameter of the micro-containers. Accordingly, the wall thickness of the micro-cylinders can be increased from the inner surface of the assembly structure towards the outer surface of the structure. Likewise, the wall thickness of the micro-spheres can be increased from the center of the second portion 32 towards the edges of the second portion 32.

Preferably, the hollow micro-cylinders 310 and the micro-spheres 320 are made of materials having different hydrogen permeability properties. Specifically, the hollow micro-cylinders 310 are made of material having relatively small hydrogen permeability at temperatures below 20° C.-30° C. and high permeability (more than 10 times higher) at temperatures above 70° C.-90° C. In turn, the hollow micro-spheres 320 are made of material having relatively small hydrogen permeability at temperatures below 50° C.-70° C. and high permeability (more than 10 times higher) at temperatures above 200° C.-250° C. For example, the hydrogen permeability at temperatures of 20° C.-30° C. can be about $(1-10) \cdot 10^{-9}$ cm$^2$/atm·sec and $(1-10) \cdot 10^{-17}$ cm$^2$/atm·sec for the material of micro-cylinders and micro-spheres, respectively. As can be understood, in this temperature interval, the hydrogen release will be mainly carried out from the micro-cylinders, whereas in the micro-spheres the hydrogen will yet be stored for its further liberation when required, upon additional increase of temperature. Thus, by controllably varying the rate of hydrogen liberation of the micro-containers, a multi-stage liberation of hydrogen gas from the hydrogen storage cartridge 14 can be provided.

Preferably, the materials selected for the micro-cylinders 310 have high tensile strength $\sigma$ and low density $\rho$. For example, the materials that meet the condition $\sigma/\rho \geq 1000$ MPa·cm$^3$/g are suitable for the micro-cylinders 310 and the micro-spheres 320. Examples of the materials suitable for the micro-cylinders 310 include, but are not limited to, polymers (e.g., aramid, KEVLAR™, TWARON™, TERLON™, ARMOS™, TECHNORA™), etc. In turn, examples of the materials suitable for the micro-spheres 320 include, but are not limited to, MgAlSi glasses (e.g., S-2 Glass™, R glass available from Saint-Gobain Vetrotex Textiles, T Glass available from Nitto Boseki Co., Ltd. (Nittobo)), fused quartz, etc.

Methods for fabrication of spaced apart hollow micro-cylinders and micro-spheres for hydrogen storage are known per se (see, for example, U.S. Pat. Nos. 4,981,625 to Won- Kyu Rhim, etc.; 5,260,002 to Masato Ishii; 5,376,347 to Masamichi Ipponmatsu, etc.; 6,224,794 to Brian G. Amsden, etc.; 6,890,592 to Troy Ronald Seehafer, etc.; and 6,998,074 to Dalia Radulescu, the disclosures of which are incorporated hereby by reference into this description), and therefore will not be expounded hereinbelow.

According to the embodiment shown in FIG. 2, the assembly structure of two different types of micro-containers is enveloped by the case 141. When required, the inner surface of the case wall can be bound to the peripheral micro-cylinders of the first portion 31 of the assembly structure. Generally, the case 141 can be constructed of any suitable metal, plastic or composite material, and may be of any desired shape and configuration having rigidity sufficient for manipulation of the cartridge for its insertion into and for removal from the housing 11. For example, the case 141 and the micro-cylinders 310 can be made of the same material. Thickness of the case wall can, for example, be 10-15 times greater than the thickness of the micro-cylinder walls. As shown in FIG. 2, the case 141 has cylindrical shape, i.e., replicates the shape of the inner surface of the housing 11. However, generally, the case 141 can have any desired shape. When required, the case 141 can be equipped with a carry handle (not shown) arranged to facilitate a user to insert, remove and/or carry the cartridge 14.

According to an embodiment of the invention, the micro-containers (micro-cylinders and micro-spheres) in the assembly structure are closely (intimately) packed in the case 141 and, preferably, are bound together, thereby forming a rigid structure. In particular, when the micro-containers are made of glass, polymer or metal, they can be bound together, for example, by sintering. Likewise, an adhesive material, such as glue, can also be used for binding the micro-containers.

The micro-containers are assembled together in the assembly structure. Thus, in the first portion 31 of the assembly structure, the neighboring micro-cylinders abut on one another at their walls forming empty inter-cylinder spaces 33 along the micro-cylinders. Likewise, the neighboring micro-spheres abut on one another at their walls forming empty inter-sphere spaces 34 in the second portion 32 of the assembly structure.

According to an embodiment of the invention, the hydrogen liberating tool 15 includes an activation element, such as one or more electrically heating elements associated with the cartridge 14 for activation of liberation (diffusion release) of the hydrogen gas stored within the micro-containers. For the embodiment shown in FIG. 2, the activation element includes a first heating element 151 associated with the first portion 31 of the assembly structure, and a second heating element 152 associated with the second portion 32 of the assembly structure.

According to one embodiment of the invention, the micro-containers are covered with a hydrogen absorbing layer of electrically conductive material so that a conductive path is formed when the micro-containers abut on one another. The coating layer can be formed by at least one coating process selected from chemical vapor deposition, electroplating, electroless plating, sol gel, plasma-activated chemical vapor deposition, sputtering, and painting.

According to another embodiment, the adhesive material utilized for binding the micro-containers has electrically conductive properties so that electrical percolation through this adhesive material can be provided when electric voltage is applied across the first and/or second portions, respectively. It should be understood that when electric voltage is applied across a conductive material, an electric current passing through the material is produced that generates heat.

Thus, according to this embodiment of the invention, the first heating element 151 includes a first pair of electrodes 153 electrically coupled across the first portion 31 to the percolating electrical conductive adhesive material binding the micro-cylinders 310. The first heating element 151 is configured for coupling the adhesive material to the controllable electric power source 19. In turn, the second heating element 152 includes a second pair of electrodes 154 electrically coupled across the second portion 32 to the percolating adhesive material binding the micro-spheres 320.

The first electrically heating element 151 and the second electrically heating element 152 are powered by the controllable power source 19. In operation, depending on the pressure of the hydrogen gas within the chamber 13 measured by the pressure sensor 161 and the time requirement for the cartridge to start providing hydrogen gas, the control system is, inter alia, adapted to control the operation of the power source 151. Thus, the first and second electrically heating elements powered by the controllable power source 19 can controllably vary the voltage applied to the first and/or second pairs of electrodes, thereby changing the temperature of the micro-cylinders 310 and the micro-spheres 320, respectively. The hydrogen liberation can be controlled in such a manner that the voltage applied across the first and/or second portions of the assembly of the micro-containers can be increased when the pressure in the chamber 13 is lower than the required level, and vice versa, the voltage is decreased when the pressure in the chamber 13 is higher than the required level.

When required to control temperature during the heating of the micro-containers, the cartridge 14 can be equipped with one or several temperature sensors (not shown) arranged, for example, in the inter-cylinder and inter-sphere spaces, and configured for measuring temperature of the micro-containers and producing temperature sensor signals indicative of the temperatures. The temperature sensors can be coupled to the control system 16 which can, inter alia, be responsive to the temperature sensor signals and capable of providing a control of the electrically heating elements 151 and 152 to avoid overheating and damage of the cartridge elements.

The controllable variation of the temperatures can provide a controllable release of the hydrogen gas stored within the micro-containers into a volume of the case 141 that is not occupied by the micro-containers, i.e., in the inter-cylinder spaces 33 and the inter-sphere spaces 34, respectively. In turn, the hydrogen gas accumulated within this volume of the case 141 that is not occupied by the micro-containers can be further discharged into a volume 130 of the chamber 13 that is not occupied by the cartridge 14. For example, the hydrogen gas can diffuse through the walls of the case 141 into the volume 130. Moreover, when desired, a special valve (not shown) can be arranged within the case 141 for controllable liberation of the hydrogen from the cartridge 14 into the volume 130.

Such a multi-stage liberation of hydrogen gas provides a possibility to quickly heat the first portion of the cartridge 14 and thus start supply of hydrogen gas from the micro-cylinders 310 and inter-cylinder spaces 33 in a rather short time interval after switching on the first electrically heating element 151, e.g., in 3-5 seconds. On the other hand, heating to relatively high temperatures of the second portion of the cartridge requires more time. Therefore, the hydrogen gas stored in the micro-spheres 320 and the inter-sphere spaces 34 can be supplied at the later stage.

Figure 4:
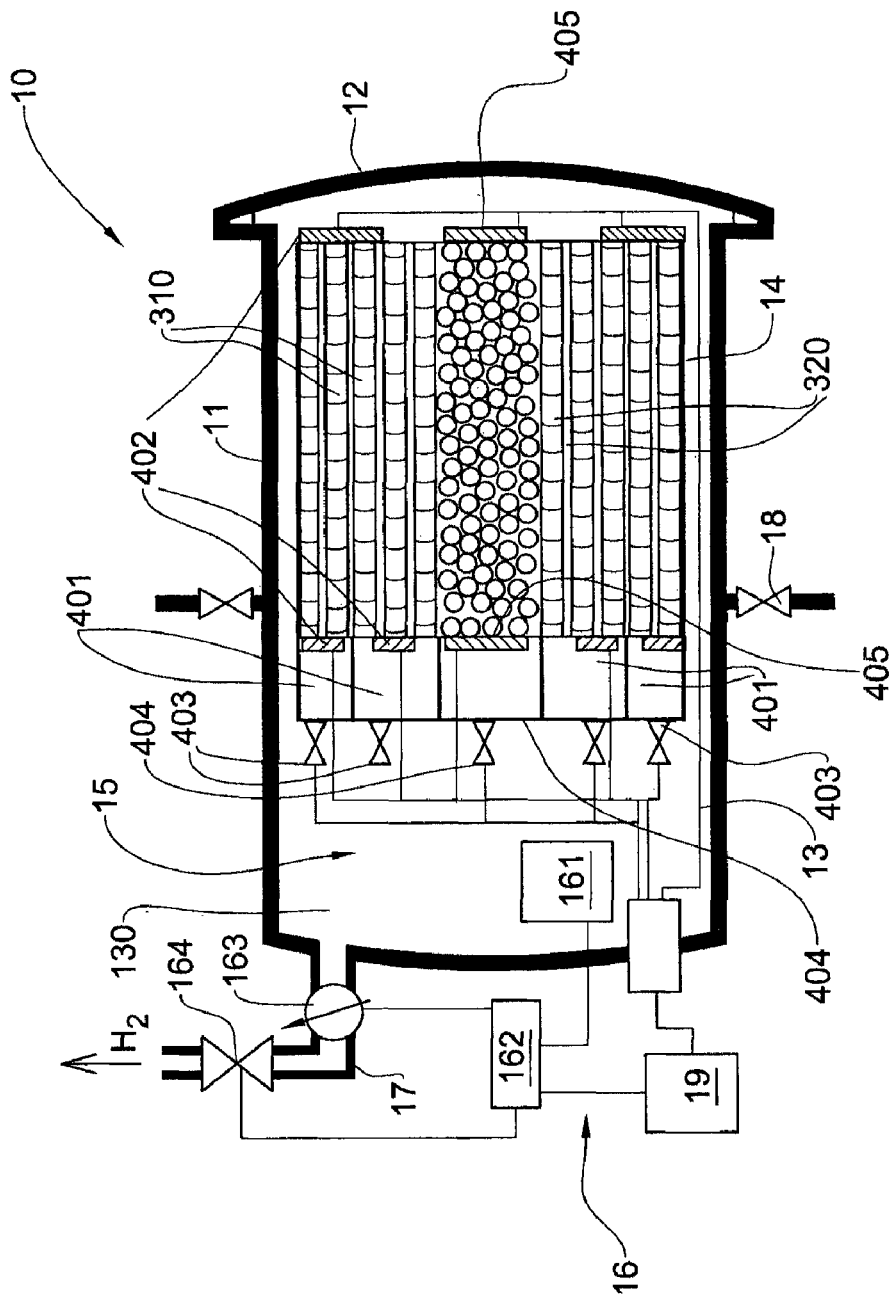
FIG. 4 is a schematic longitudinal cross-sectional view of the apparatus of FIG. 1 including a hydrogen storage cartridge and the hydrogen liberating tool, according to another embodiment of the present invention.

Referring to FIG. 4, a schematic longitudinal cross-sectional view of the apparatus of FIG. 1 including a hydrogen storage cartridge is illustrated, according to another embodiment of the present invention. The cartridge of this embodiment differs from the cartridge shown in FIG. 2 in the fact that it includes a plurality of interface gas collectors 401, each collector associated with a part of the total number of the micro-cylinders 310. Each part of the micro-cylinders 310 is equipped with a corresponding heating element 402 having a corresponding pair of electrodes coupled to the conductive adhesive material binding the micro-cylinders 310.

In operation, the hydrogen gas stored within each part of the micro-cylinders and the inter-cylinder spaces can be controllably released into volumes of the corresponding interface gas collectors 401. In turn, the hydrogen gas from the interface gas collectors 401 can be further controllably discharged into a volume 130 of the chamber 13 that is not occupied by the cartridge 14 through the corresponding interface collector valves 403 arranged in the case of the gas collectors 401, and operatively coupled to the controller 162. For example, when the gas pressure in the chamber 13 measured by the pressure sensor 161 is less than a predetermined pressure value, the controller 162 can generate control pressure signals for controlling the operation of the interface collector valves 403 and thereby to provide discharge of hydrogen gas from one or more interface gas collectors 401 into the volume 130 of the chamber 13.

According to this embodiment of the invention, the cartridge can also include one or more interface gas collectors 404 associated with a total number or a part of the micro-spheres 320. The micro-spheres 320 are equipped with a corresponding heating element having a corresponding pair of electrodes 405 coupled to the conductive adhesive material binding the micro-spheres 320. In operation, when required, the hydrogen gas can be first accumulated into the volume of the gas collectors 404. A special interface valve 405 can be arranged within the case of the gas collectors 404 for controllable discharge of the hydrogen from the gas collectors 404 into the volume 130.

Figure 5:
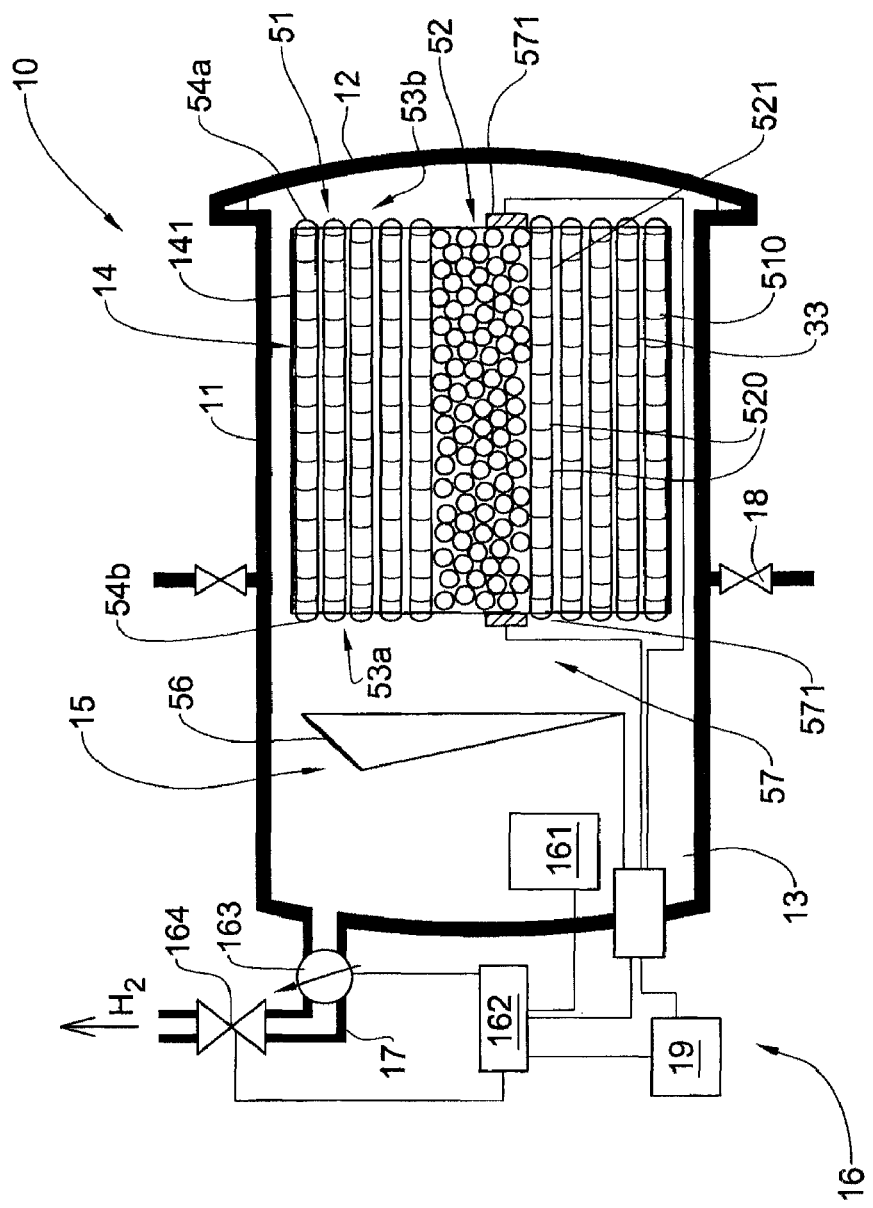
FIG. 5 is a schematic longitudinal cross-sectional view of the apparatus of FIG. 1 including a hydrogen storage cartridge and a hydrogen liberating tool, according to one embodiment of the present invention, according to yet another embodiment of the present invention.

Referring to FIG. 5, a schematic view of the apparatus of FIG. 1 in which the hydrogen storage cartridge and the hydrogen liberating tool 15 are illustrated according to yet another embodiment of the present invention. According to this embodiment of the invention, the cartridge 14 is configured essentially similar to that shown in FIG. 2. Specifically, the cartridge 14 includes the case 141 and an assembly structure of two different types of micro-containers located in the case 141. The assembly structure of the micro-containers includes a first portion 51 having tubular shape and a second portion 52 having cylindrical shape and located within the lumen of the first portion 51.

The first portion 51 includes a plurality of closely packed hollow micro-cylinders 510 arranged axially within the first portion 51. Ends 53a and 53b of the micro-cylinders 510 are sealed. Specifically, the ends 53a of the micro-cylinders 510 distal to the hydrogen liberating tool 15 are sealed with caps 54a made of a impermeable to hydrogen material, whereas the ends 53b of the micro-cylinders 510 proximate to the hydrogen liberating tool 15 are covered with caps 54b made of a hydrogen diffuser material. Thus, the micro-cylinders 510 (sealed from the two ends) can store hydrogen gas at high pressure.

According to this embodiment of the invention, the hydrogen diffuser material (sealing the ends 53b) features photo-enhanced hydrogen diffusion characteristics. According to one example, the hydrogen diffuser material is characterized by photo-enhanced hydrogen diffusion. The materials that demonstrate great acceleration of the release rate of hydrogen therethrough owing the infrared (IR) radiation are known in the art (see, for example, a paper titled "Photo-Enhanced Hydrogen Outgassing of Glass," by D. B. Rapp and J. E. Shelby, published in *J. Non-Cryst. Solids,* 2004, V. 349, PP. 254-259). For example, doping commercially available borosilicate glasses with optically active elements (e.g., $Fe_3O_4$) can result in a drastic sensitivity of the rate of hydrogen diffusion to IR radiation.

According to this embodiment of the invention, for activation hydrogen liberation from the micro-cylinders 510, the hydrogen liberating tool 15 includes an activation element, such as a controllable radiation source 56 providing photo-enhanced diffusion of hydrogen through the caps 54b when the caps 54b are illuminated by the radiation of the predetermined frequency range. Depending on the hydrogen diffuser material of the caps 54b the controllable radiation source 56 can operate in various ranges of the electromagnetic scale.

For example, when the hydrogen diffuser material is based on the Pyrex™ glass doped with $Fe_3O_4$ the controllable radiation source 56 can be an infrared (IR) lamp. In effect, the IR radiation causes the dopant to react, opening up the microscopic pores that occur naturally in the glass. The hydrogen, which is under high pressure inside the micro-cylinders 510, can diffuse through the pores opened in the caps 54b. In this case the release of the hydrogen from the micro-cylinders 510 can be controlled by varying the intensity of the IR radiation and/or by simply turning the IR source on and off.

The radiation source 56 can be controlled by the control system 16. In operation, depending on the pressure of the hydrogen gas within the chamber 13, the control system is, inter alia, adapted to control the operation of the radiation source 36 by varying the intensity of the applied radiation and/or by turning the power source 19 on and off with a predetermined periodicity, thereby providing a controllable liberating of the hydrogen stored within the micro-cylinders 510 into the volume of the chamber 13 that is not occupied by the cartridge 14. For example, when the pressure in the chamber is low, the intensity of the radiation can be increased, and vice versa.

In turn, the second portion 52 of the assembly structure of the micro-containers includes a plurality of closely packed partially permeable to hydrogen hollow micro-spheres 520 filling the cylindrical volume of the second portion 52, similar to that shown in FIG. 2. For activation of hydrogen liberation from the micro-spheres 520, the hydrogen liberating tool 15 includes a sphere heating element 57 associated with the second portion 52 and configured for heating the micro-spheres 520. Similar to the case shown with reference to FIG. 2, the sphere heating element 57 includes a pair of electrodes 571 electrically coupled across the second portion 52 to the percolating adhesive material binding the micro-spheres 520.

The sphere heating element 57 is powered by the controllable electrical power source 19. In operation, depending on the pressure of the hydrogen gas within the chamber 13 measured by the pressure sensor 161 and the time requirement for the cartridge to start providing hydrogen gas, the control system is, inter alia, adapted to control the operation of the power source 19. Thus, the sphere heating element 57 powered by the controllable power source 19 can controllably vary the voltage applied to the pairs of electrodes 571, thereby changing the temperature of the micro-spheres 520. The hydrogen liberation can be controlled in such a manner that the voltage applied across the second portions of the assembly of the micro-containers can be increased when the pressure in the chamber 13 is lower than the required level, and vice versa, the voltage is decreased when the pressure in the chamber 13 is higher than the required level.

Thus, the apparatus of this invention provides a possibility to liberate hydrogen gas from the first portion of the cartridge 14 and therefore start supply of hydrogen gas from the micro-cylinders 510 and inter-cylinder spaces 33 in a rather short time interval after switching on the controllable radiation source 56, e.g., in 3-5 seconds. Thereafter, the second portion of the cartridge can be activated, so that the hydrogen gas stored in the micro-spheres 520 and inter-sphere spaces 521 can be supplied at the later stage.

Figures 6, 7:
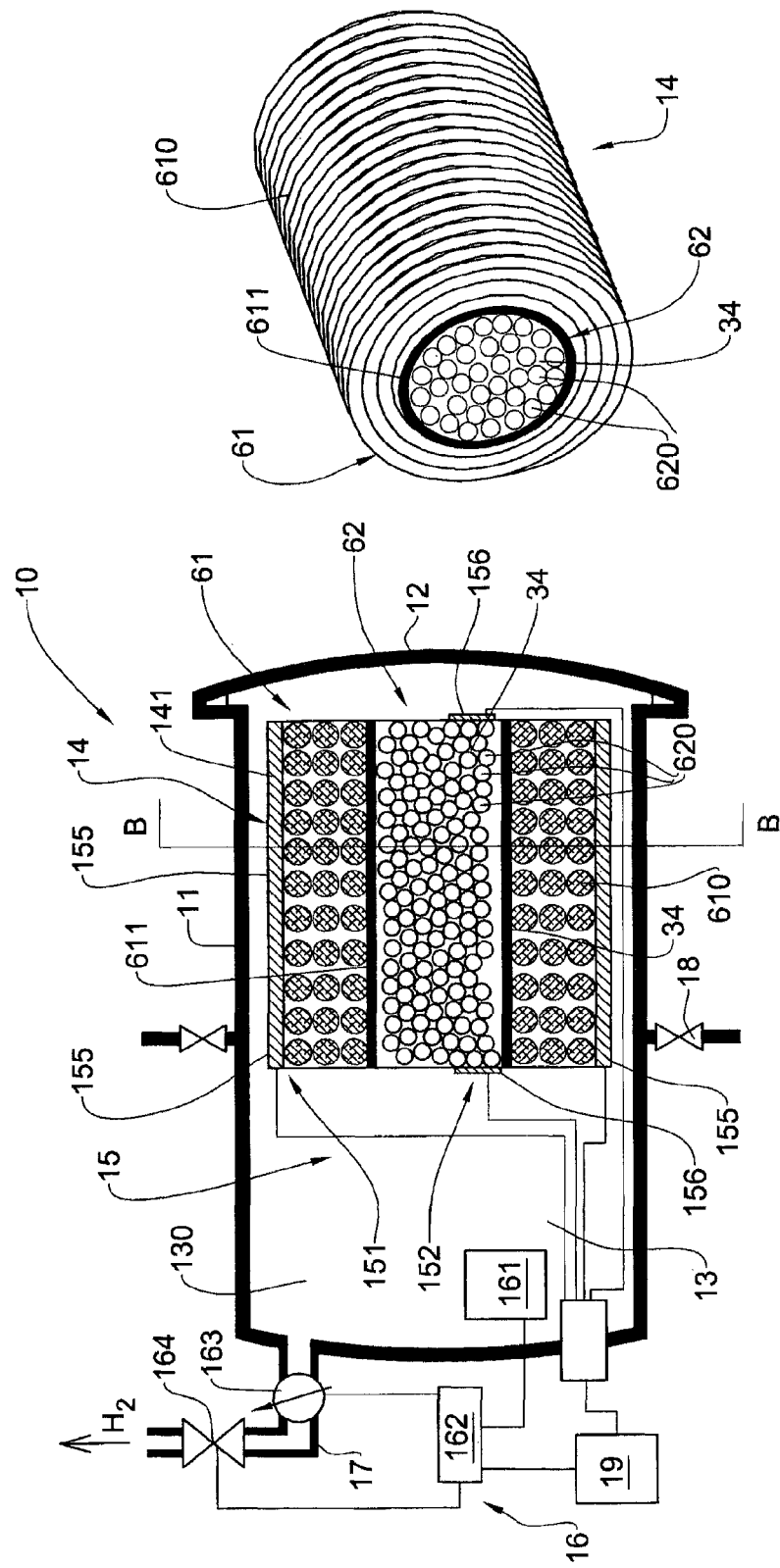
FIG. 6 is a schematic longitudinal cross-sectional view of the apparatus of FIG. 1 including a hydrogen storage cartridge and the hydrogen liberating tool, according to one embodiment of the present invention, according to still another embodiment of the present invention.
FIG. 7 is a schematic perspective view with a top cross-sectional cut the cartridge of FIG. 5 taken along the line B-B therein.

Referring to FIG. 6, a schematic longitudinal cross-sectional view of the apparatus of FIG. 1 in which the cartridge 14 for hydrogen storage and the hydrogen liberating tool 15 are illustrated according to yet another embodiment of the present invention. According to this embodiment, the cartridge 14 includes a case 141 and an assembly structure of two different types of micro-containers located in the case 141. A schematic perspective view with a top cross-sectional cut of the cartridge of FIG. 7 taken along the line B-B therein is shown in FIG. 7. It should be noted that for simplicity purpose the case 141 is not shown in FIG. 7.

As can be understood from FIGS. 6 and 7, the assembly structure of the micro-containers includes a first portion 61 having tubular shape and a second portion 62 having cylindrical shape and located within the lumen of the first portion 61.

Figure 8:
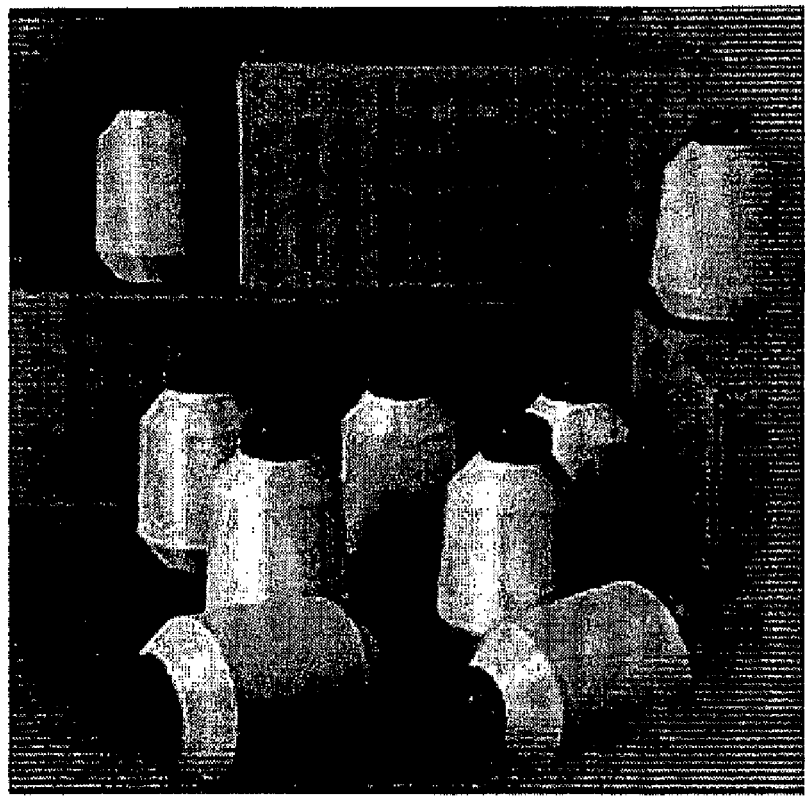
FIG. 8 shows examples of supporting cylinders with micro-cylinder (microtubes) wound thereon.

The first portion 61 includes a supporting cylinder 611 and at least one hollow micro-cylinder (microtube) 610 coiled round the second portion 62. For example, the first portion 61 can include a supporting cylinder 611 and the micro-cylinder 610 can be wound on the supporting cylinder 611 in one or more layers. Ends of the micro-cylinder 610 are sealed, e.g., capped on the ends by semi-spheres having comparable wall thickness. The hollow micro-cylinder 610 is made of a material that is at least partially permeable to hydrogen, to allow hydrogen molecules to diffuse therethrough. Examples of the supporting cylinders with the micro-cylinder (microtube) wound thereon are illustrated in FIG. 8.

The second portion 62 of the assembly structure of the micro-containers is similar to that described above with reference to FIGS. 2-5. It includes a plurality of closely packed partially permeable to hydrogen hollow micro-spheres 620 filling the volume of the supporting cylinder 611.

According to this embodiment of the invention, the hydrogen liberating tool 15 includes one or more electrically heating elements powered by the controllable electric power source 19 and associated with the cartridge 14 for activation of liberation (diffusion release) of the hydrogen gas stored within the micro-containers of the first and second portions 61 and 62. Specifically, the activation element includes the first heating element 151 associated with the first portion 61 of the assembly structure, and the second heating element 152 associated with the second portion 62 of the assembly structure.

According to this embodiment of the invention, the micro-cylinder 610 can be covered with electrically conductive material so that a conductive path is formed when turns and layers of the coiled micro-cylinder 610 abut on one another. Moreover, an electrically conductive adhesive material can be utilized for binding the turns and layers of the coiled micro-cylinder so that electrical percolation through this adhesive material is provided when electric voltage is applied across the first portion 61. When electric voltage is applied across the conductive material, an electric current passing through the material is produced that generates heat required for release of hydrogen gas.

Likewise, the micro-spheres can be covered with electrically conductive material so that a conductive path is formed when the micro-containers abut on one another. Alternatively, the micro-spheres can be bound with an electrically conductive adhesive material so that electrical percolation through this adhesive material can be provided when electric voltage is applied across the second portion.

Thus, according to this embodiment of the invention, the first heating element 151 includes a first pair of electrodes 155 electrically coupled across the coiled micro-cylinder 610. The first pair of electrodes 155 is configured for coupling either to the conductive layer covering the micro-cylinder or to the adhesive material binding the turns and layers. In turn, the second heating element 152 includes a second pair of electrodes 156 electrically coupled across the second portion 62 either to the conductive layer or to the percolating adhesive material binding the micro-spheres 620.

The controllable variation of the voltage applied to the first and second heating elements can provide a controllable release of the hydrogen gas stored within the micro-containers into a volume of the case 141 that is not occupied by the micro-containers. In turn, the hydrogen gas from this volume can be further discharged into a volume 130 of the chamber 13 that is not occupied by the cartridge 14. For example, the hydrogen gas can diffuse through the walls of the case 141 into the volume 130. Moreover, when desired, a special valve (not shown) can be arranged within the case 141 for controllable liberation of the hydrogen from the cartridge 14 into the volume 130.

Such a multi-stage liberation of hydrogen gas provides a possibility to quickly heat the first portion of the cartridge 14 and thus start release of hydrogen gas from the micro-cylinder in a rather short time interval after switching on the first electrically heating element 151, e.g., in 3-5 seconds. On the other hand, heating to relatively high temperatures of the second portion of the cartridge requires more time. Therefore, the hydrogen gas stored in the micro-spheres 620 and the inter-sphere spaces 34 can be supplied at the later stage.

The hydrogen accumulation and storage cartridge 14 can be filled with hydrogen gas by placing the cartridge 14 in a high temperature and pressure environment. It should be understood that the cartridge 14 should not be sealed so that the micro-containers (micro-cylinders and micro-spheres) are exposed to the environment.

As is known, the gas will diffuse through the walls of the micro-containers inside the hollow micro-containers at a rate which increases with increasing pressure and/or temperature. In such a case, each micro-container acts as a small-volume high-pressure containment vessel. After the accumulation of the hydrogen gas, the cartridge 14 can be cooled down under high pressure, and then the pressure can be decreased or maintained at the same magnitude as inside the micro-spheres.

According to an embodiment, the filling of the hydrogen accumulation and storage cartridge 14 is carried out in an autoclave that withstands high pressure and has a heating system. First, the autoclave is vacuumed, for example, by a vacuum booster pump to remove air, following which it is filled with hydrogen gas to an excess pressure, that can be in the range of about 1-3000 atm. Afterwards, the autoclave is heated to a temperature in the range of about 200° C.-500° C. (depending on the material of the micro-containers). The cartridge 14 is maintained under these conditions, until hydrogen pressures in the autoclave and inside the micro-containers equalize due to hydrogen diffusion. Then, the system is cooled down to the room temperature at the same excess pressure. By maintaining the hydrogen accumulation and storage cartridge 14 at relatively low ambient temperatures, e.g., at 24° C., the amount of hydrogen gas escaping from the micro-containers will be minimal, so that the gas can be stored within the cartridge 14 during the long time period.

Then, the hydrogen pressure in the autoclave can be dropped, and the cartridge 14 can be removed from the autoclave and placed in the chamber (13 in FIG. 1) of the apparatus (10 in FIG. 1). Once the hydrogen liberation tool 15 is activated to maintain the temperature in the range of 80° C.-100° C., hydrogen will start to release from the micro-cylinders to the chamber (13 in FIG. 1). Accordingly, heating to the temperature in the range of 250° C.-300° C. will result in release of hydrogen gas from micro-spheres.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

Although the micro-containers of two types, such as cylindrical and spherical, were described above, the present invention is not limited to these two types of micro-containers. Likewise, the micro-containers can have ellipsoidal, conical and other shapes.

It is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims.

The invention claimed is:

1. An apparatus for storage of compressed hydrogen gas, comprising:
   a sealed housing having an outlet pipe coupled to the housing and equipped with a controllable discharge valve, said sealed housing defines a chamber that includes a cartridge comprising an assembly of at least two different types of micro-containers configured for accumulating and storing said compressed hydrogen gas; said micro-containers are selected from at least one hollow partially permeable to hydrogen micro-cylinder having sealed ends, and a plurality of partially permeable to hydrogen hollow micro-spheres; and
   a hydrogen liberating tool configured for controllable liberating the hydrogen gas from the cartridge into a volume of the chamber that is not occupied by the cartridge.

2. The apparatus of claim 1 comprising a control system operatively coupled to said controllable discharge valve and to said hydrogen liberating tool, and configured for controlling operation thereof, said control system comprising:
   a pressure sensor configured for producing a pressure sensor signal representative of the hydrogen as pressure in the chamber,
   a flow meter configured for producing a gas flow sensor signal representative of the flow of the hydrogen gas pressure in the outlet pipe; and
   a controller operatively coupled to said pressure sensor and said flow meter, and being responsive to said pressure sensor signal and said gas flow sensor signal, said controller being capable of generating control signals for controlling the operation of said hydrogen liberating tool and the discharge valve.

3. The apparatus of claim 2 wherein a structure of the said assembly of micro-containers includes a first portion having tubular shape, and a second portion located within a lumen of the first portion and having cylindrical shape, said first portion and having cylindrical shape, includes a plurality of micro-cylinders closely packed and arranged axially within said first portion; whereas said second portion includes said plurality of the micro-spheres closely packed and filling the cylindrical volume of the second portion.

4. The apparatus of claim 2 wherein a structure of said assembly of micro-containers includes a first portion having tubular shape, and a second portion located within a lumen of the first portion and having cylindrical shape, said first portion includes one hollow micro-cylinder being coiled round the second portion, whereas said second portion includes said plurality of the micro-spheres being closely packed and filling the cylindrical volume of the second portion.

5. The apparatus of claim 3 wherein said hydrogen liberating tool includes:
   at least two heating elements associated with said at least two different types of micro-containers, respectively; and
   a controllable power source coupled to said control system and configured for controllable powering said at least two heating elements to controllably vary a temperature of the micro-containers.

6. The apparatus of claim 3 wherein ends of said plurality of micro-cylinders at least proximate to said hydrogen liberating tool are covered with caps made of hydrogen diffuser material that features photo-enhanced hydrogen diffusion, whereas the hydrogen liberating tool includes a controllable radiation source operating in a predetermined radiation frequency range, said controllable radiation source being coupled to the control system adapted to control operation of the radiation source, thereby providing photo-enhanced diffusion of hydrogen through said hydrogen diffuser material when it is illuminated by said controllable radiation source.

7. The apparatus of claim 6 wherein the control of the operation of the radiation source is carried out by either varying the intensity of the applied radiation or turning the source on and off with a predetermined periodicity.

8. The apparatus of claim 3 wherein at least a part of the micro-cylinders and the micro-spheres are covered with a hydrogen absorbing layer of electrically conductive material.

9. The apparatus of claim 8 wherein said hydrogen liberating tool includes:
   a first heating element having a first pair of electrodes coupled to said electrically conductive hydrogen absorbing layer of the micro-spheres across said first portion of the cartridge;
   a second heating element having a second pair of electrodes coupled to said electrically conductive hydrogen absorbing layer of the micro-cylinders across said second portion of the cartridge; and
   a controllable power source coupled to the control system and configured for controllable powering the first heating element and the second heating element to controllably vary a temperature of the micro-spheres and micro-cylinders.

10. The apparatus of claim 3 wherein at least a part of the micro-cylinders and the micro-spheres are bound together by an electrically conductive adhesive material.

11. The apparatus of claim 10 wherein said hydrogen liberating tool includes:
   a first heating element having a first pair of electrodes coupled to said electrically conductive adhesive material across said first portion of said cartridge;
   a second heating element having a second pair of electrodes (154) coupled to said electrically conductive adhesive material across said second portion of said cartridge; and
   a controllable power source coupled to the control system and configured for controllable powering the first heating element and the second heating element to controllably vary a temperature of the micro-containers.

12. The apparatus of claim 1 wherein the material of said at least one hollow micro-cylinder is selected from polymers and composite materials, and wherein the material of the micro-spheres is selected from MgAlSi glasses and fused quartz.

* * * * *